C. P. CARPENTER.
Horse Rake.
No. 39,989.
2 Sheets—Sheet 2.
Patented Sept. 15, 1863.
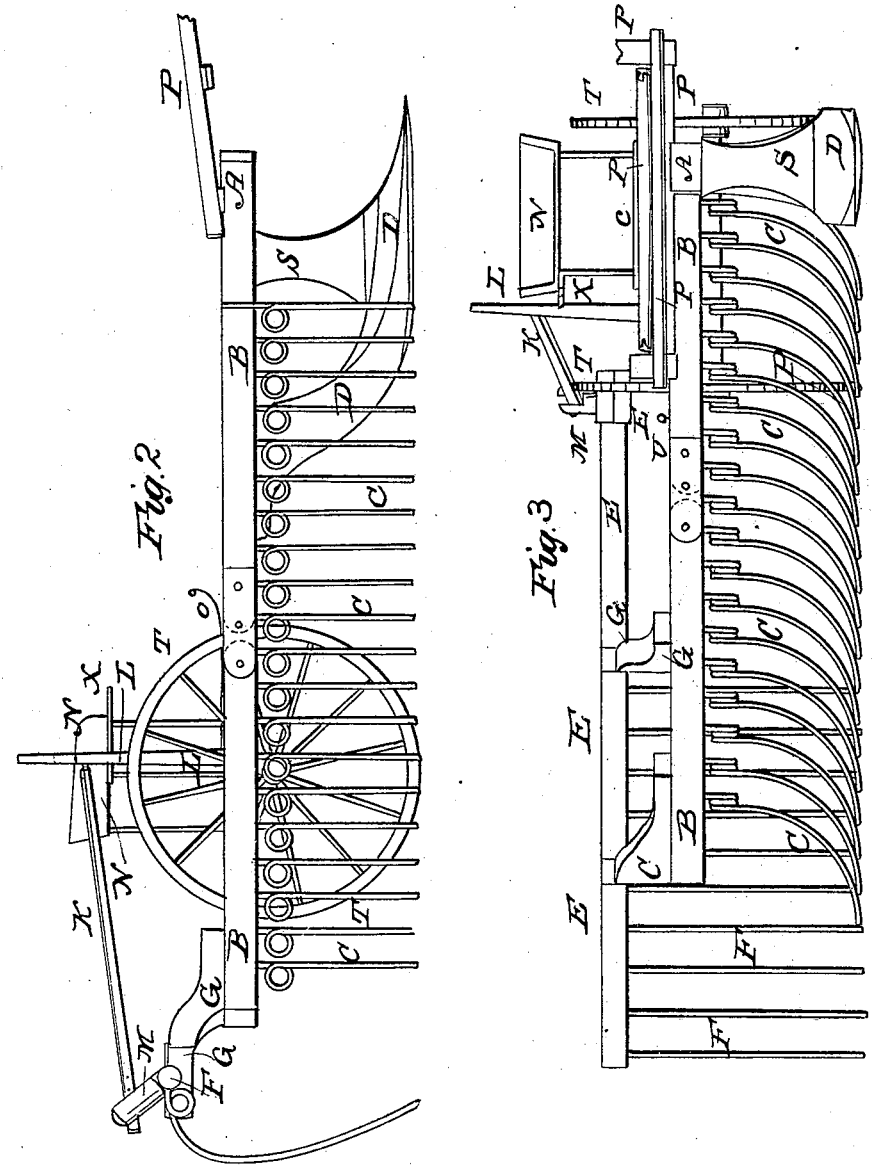
Witnesses
Aaron Forshau
A. G. Chadwick
Inventor
Charles P. Carpenter

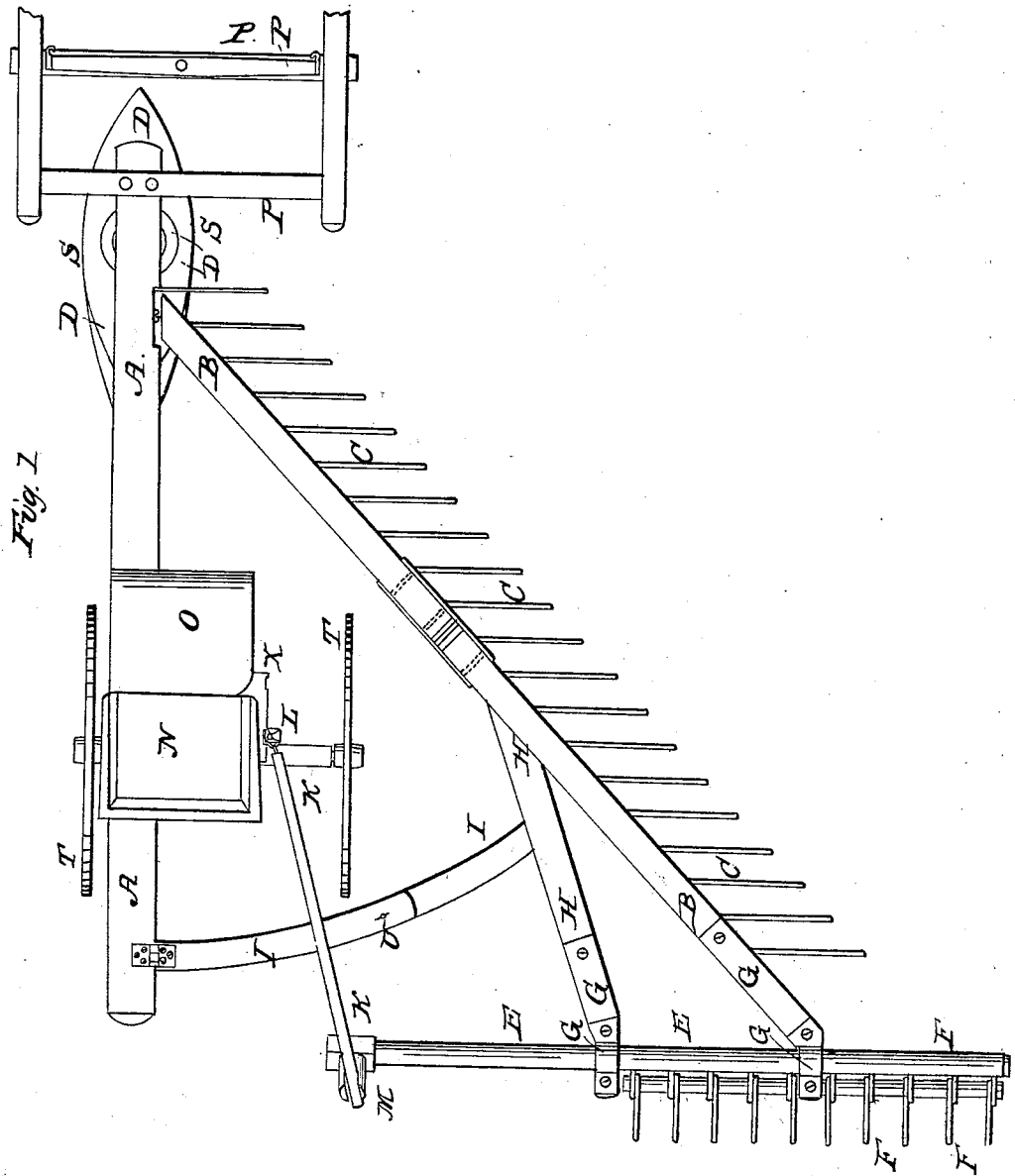

UNITED STATES PATENT OFFICE.

CHARLES P. CARPENTER, OF ST. JOHNSBURY, VERMONT, ASSIGNOR TO HIMSELF AND EBEN L. CLEMENT.

IMPROVEMENT IN HAY-RAKES.

Specification forming part of Letters Patent No. 39,989, dated September 15, 1863; antedated December 17, 1862.

*To all whom it may concern:*

Be it known that I, CHARLES P. CARPENTER, of St. Johnsbury, in the county of Caledonia and State of Vermont, have invented a new and useful Machine for Raking Hay by Horse-Power or other Motive Agent; and I do hereby declare that the following is a full, clear, and exact description of the construction and operation of the same, reference being had to the annexed drawings, making part of this specification, in which—

Figure 1 is a plan. Fig. 2 is a right-hand side elevation, and Fig. 3 a front elevation, the same letters in all the figures referring to the same parts.

The nature of my invention consists in constructing a hay-rake with a longitudinal draft-beam, to which on either or both sides, near the forward end, one or more side beams or rake-heads proper is or are attached by a toggle or universal joint, which allows said rake head or heads to be set at or about at an angle of forty-five degrees (more or less) to the line of draft, for purposes hereinafter explained. This side rake-head is furnished with a suitable number of steel spiral-spring teeth, which also are at an angle of about ninety degrees, (more or less,) so that in operation the hay is taken up by them and thrown into a windrow very much in the same manner as a furrow is thrown out by a plow.

To enable others to construct and set in operation this rake, I will proceed to describe its several parts in detail, and also its mode of operation.

A A is a longitudinal or central beam of suitable size and strength, mounted on wheels T T, and furnished with the driver's seat N N and its foot-board O O, and with the shafts and whippletree P P.

B B is a side beam or rake-head proper, hinged by a universal or toggle joint to the beam A, near its forward end, and kept at the required angle from said beam by the extension-bar I I, which bar is also hinged to the beam A, near its rear end. This rake-head B is or may be jointed about midway its length to give it greater pliability when passing over uneven ground, and is furnished with a suitable number of curved spiral spring-steel teeth set nearly at right angles to the line of draft, but having thin coiled springs at or nearly in said draft-line, thus giving them, (the teeth,) when in operation, a vibratory motion back and forth on said line, causing the hay to pass over them to the rear end of the rake, instead of being gathered up by them, as is usual in other rakes.

D is a shoe attached firmly to the beam A, designed to enter beneath the hay in advance of the teeth C C, raise the same from the ground, and give the teeth a free entrance into or beneath said hay. This shoe supports the spool S revolving on a spindle, one end of which is inserted in the shoe and the other in the beam A, and intended to separate the hay raised by the shoe, and allow what the teeth will catch to pass that side.

I I are the parts of an extension-bar alluded to above, designed to spread and hold the rake-head B at any desired angle to the line of draft, adapting the rake to heavy or light work, as the case may require. This bar is confined, when properly adjusted, by a pin or thumb-screw, as shown at U, Figs. 1 and 2.

Attached to the rear end of the rake-head B, and supported on the raised knees G G, is the tumbling-rake E E, with its teeth F F to throw the windrow when formed into cocks or bunches, and this attached rake is worked by the lever L, the connecting-rod K, and the post M. This post turns on a vertical axis to adapt it to the different positions of the head B when more or less expanded, and the connecting-rod K is attached to the lever L by a toggle-hinge for the same purpose. The lever L is placed within convenient reach of the driver, is hinged at its lower end, and is held in proper position by the notched rack X. The tumbling-rake just described is only a supplement to the hay-rake proper, and may be detached at pleasure or left off altogether.

The operation of the above-described hay-rake will now be readily understood, as follows: The shoe D will first enter the hay and prepare an entrance for the teeth C C. These teeth are so coiled and curved as to allow the hay taken up by them to slide freely along their front surfaces, and to be deposited in windrow at the rear end, parallel to the line of draft, much in same manner as a plow takes up, turns, and deposits its furrow, and when this process is repeated on the reverse side a complete windrow is formed, which by the operation of the tumbling-rake is thrown into bunches or cocks.

It will also be seen that the peculiar manner of jointing the rake-head B near its center, and of hinging it and the extension-bar I to the beam A, will allow said rake-head to be set and held at any desired angle to the line of draft, and at the same time also allow the rake or either or both the wheels to rise or fall in passing over obstructions or into depressions without straining the parts or impairing the efficiency of the machine.

What I claim as my invention, and desire to secure by Letters Patent, is—

The arrangement, in combination with the longitudinal beam A, of the shoe D, roller S, diagonal and adjustable head B on one or both sides of the beam A, and the tumbling-rake E, substantially in the manner and for the purposes as set forth.

CHARLES P. CARPENTER. [L. S.]

Witnesses:
  A. G. CHADWICK,
  AARON FARNHAM.